April 19, 1927. 1,625,410
G. H. E. DE RAM
UNIVERSAL JOINT FOR SHAFTS
Original Filed March 5, 1923   2 Sheets-Sheet 1
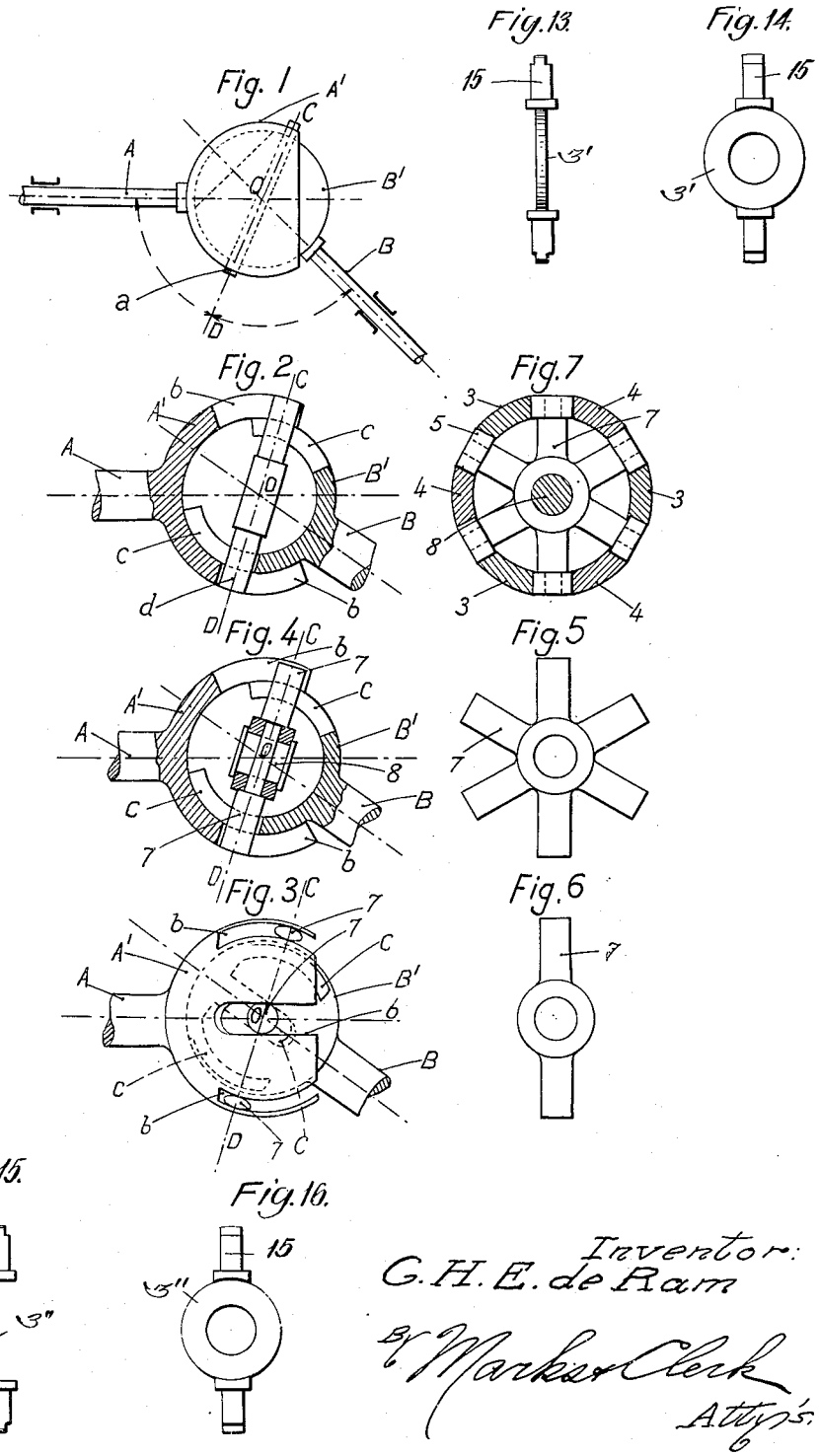

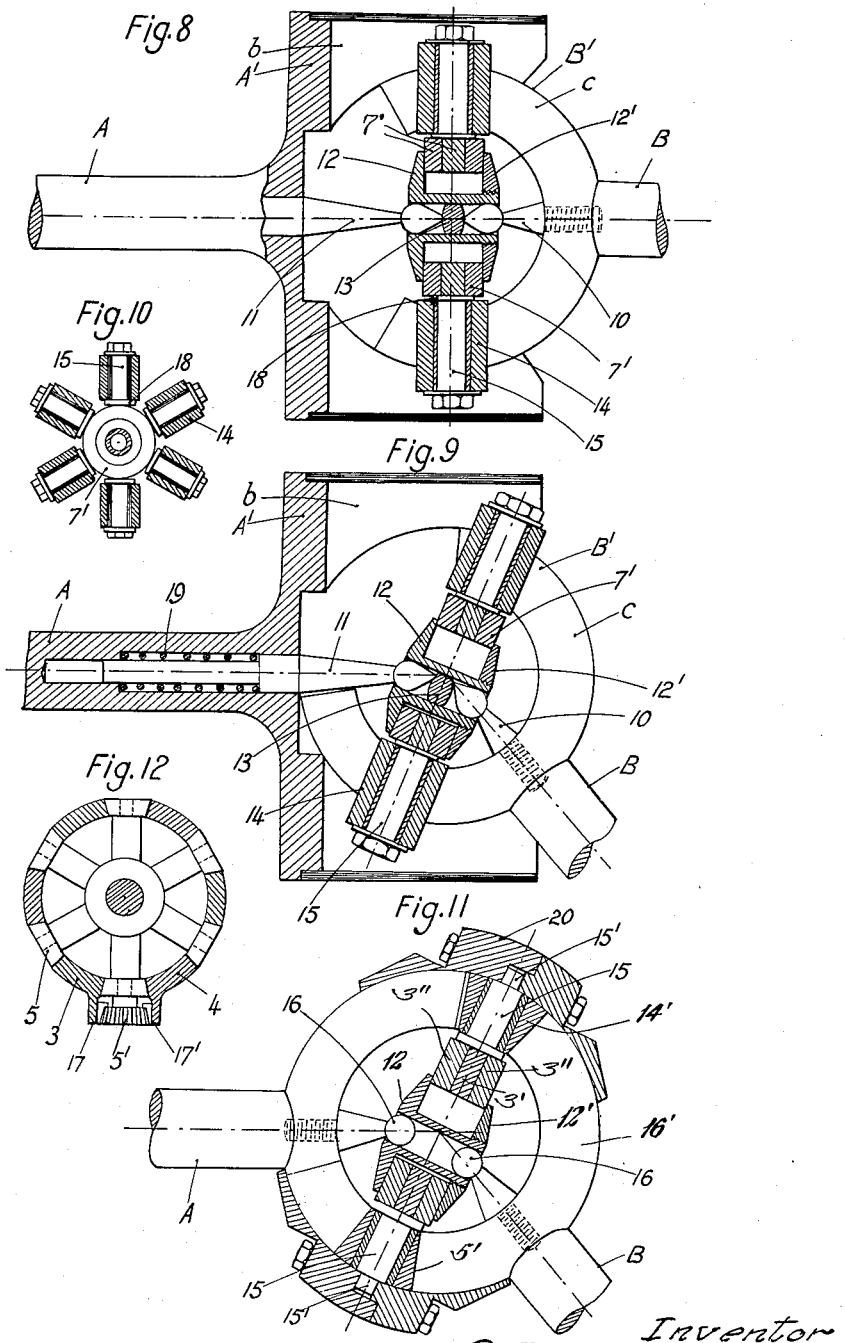

Patented Apr. 19, 1927.

1,625,410

UNITED STATES PATENT OFFICE.

GEORGES HENRI ERNEST DE RAM, OF BOULOGNE-SUR-SEINE, FRANCE.

UNIVERSAL JOINT FOR SHAFTS.

Application filed March 5, 1923, Serial No. 623,000, and in France March 23, 1922. Renewed February 1, 1927.

This invention relates to universal joints for shafts, and its object is to produce a joint of this kind in which the speeds of the driven shaft are strictly the same as those of the driving shaft.

Fig. 1 is a side elevational view showing the principle involved in the present invention, Fig. 2 is an enlarged sectional view thereof, Fig. 3 is an elevational view of a slightly modified form of the invention, Fig. 4 is a sectional view thereof, Fig. 5 is a front elevational detail of one of the parts used in the arrangement shown in Fig. 4, Fig. 6 is an elevational detail of one of the sections forming the arrangement shown in Fig. 5, Fig. 7 is a transverse sectional view of a further slightly modified form of the arrangement, Fig. 8 is an enlarged longitudinal sectional view of the complete form of joint in accordance with the present form of the invention, Fig. 9 is a similar view showing the parts arranged in different positions, Fig. 10 is an end elevational detail partly in section of a star shaped member, Fig. 11 is a sectional view partly in elevation of a further modification of the invention, Fig. 12 is a fragmentary end elevational view in section of means for maintaining the star shaped member in the desired position when the joint comprises two sphere sections of equal diameter, Fig. 13 is a side elevational view of a central section of a star shape member shown in Fig. 11, Fig. 14 is a front elevational view thereof, Fig. 15 is a side elevational view of one of the side sections of the same star shaped member, and Fig. 16 is a front elevational view thereof.

In order that the purpose and the operation of the improved universal joint, may be clearly understood, the theory thereof will first be explained.

With particular reference to Figs. 1 to 7, it is to be noted that two partial spheres A' and B', respectively integral with the shafts A and B, are employed and are concentrically fitted together as shown in the drawing, the two shafts making an angle A O B between them; if, through the centre O common to both spheres, a plane is drawn the direction C D of which bisects the angle A O B, that is to say if the angle A O D is equal to the angle D O B, it can readily be proved that the shaft A, assumed to be the driving shaft, will drive the driven shaft B in a uniform manner, if a member connecting the two spheres and passing through the common center O is maintained in the said plane. This connecting member may be in the form of an axle like that shown at $a$ as in Figure 1. The displacements of the axle being angularly the same for both spheres, it is evident that the speeds of the two shafts A and B will be the same.

It would be very impracticable to guide the axle $a$ exteriorly to the system in the plane, whose direction is C—D, the plane being perpendicular to the paper, when it is assumed that the shafts A and B lie in the plane of the paper.

In the joint according to this invention the difficulty has been solved in the following manner:

Suppose that in each of the partial spheres slots $b$—$b$, $c$—$c$, Figure 2, of suitable depth, width and shape are cut out on a great circle. It will be easy to place in them an axle $d$ passing along the line C D; but to obtain a practical joint it will be necessary to keep the axle in the directing plane.

The complete solution is shown in Figures 3, 4, 5 and 6. The grooves or slots $b$—$b$ and $c$—$c$ are here six in number and the single axle is replaced by a six-armed star member Figure 5, consisting of three axles 7 articulated on a common centre line 8. This star is located in the spheres in such manner that the directing plane cuts the centre-lines of the arms; this position is moreover the only one mechanically possible, and it is automatically taken up by the arms of the star during the equal rotation of the spheres.

Suitable shapes are given to the ends of the arms passing through the slots $b$ and $c$ for the purpose of facilitating the transmission of motion; for example it might be that the part of the arms passing through the slots $b$ would be provided with sliding thimbles, whilst the part passing through the slots c would be provided with flat pieces so as to increase the contact-surface.

In Figure 7 the spheres are no longer concentric but their diameters are equal; each of them comprises three arms 3, 3, 3 and 4, 4, 4, the slots between the arms allowing the passage of the six arms of a star like that already described in Figure 5, with guide rollers 5 either cylindrical or conical or of any other suitable shape, located at the end of each arm. A protecting spherical girdle in two parts will be desirable to secure the spheres in position.

The action is of course exactly the same as that described for the joint shown in Figure 3.

Referring to Figures 8, 9 and 10 the two shafts are shown by A and B, and the two fractions of concentric spheres by A' and B'. The six-armed star consists of three axles articulated and centered one on another by the central annular members or hub 7'. In the accompanying figures, the centering is obtained by means of shoulders 18, and rollers 14 on the arms 15 as shown in Fig. 8 or by the use of conical rollers 14', and by an outer annular member like the girdle 20, as shown in Figure 11. The star is held by the spool shaped member including two equal and concentric discs 12 and 12'; the disc 12' is screwed upon a cylindrical member integral with the disc 12. This cylindrical member which joins the two discs being of smaller diameter than the inside diameter of the hub portion or ring 7', it follows that the member 12—12' can move inside the ring 7' or hub portion of the star shaped member.

In order to keep the star in the desired position, the shafts A and B are each provided with a punch-shaped member, 11 for the shaft A and 10 for the shaft B. The end of these punches is of such shape that it can bear on the inside of the cylindrical part of the spool shaped member 12—12' maintaining the star in the desired plane, even when the shafts are in the same straight line as shown in Figure 8. At the middle of this member is a partition 13 shaped like a convex lens, the curvature of which is such that the points of the punches being arranged to bear against it prevent any longitudinal shifting of the star.

Figure 9 shows the position of maximum inclination of the shafts, the spool shaped member 12—12' is then no longer at the centre of the star and the partition 13 has slid on the surfaces of the ends of the punches.

In order to allow of fitting up the devices described, the slots in the spheres A' and B' are made in such manner that the arms B' are slightly smaller than the slots in A'. On the other hand the punch 11, Figure 9, can slide axially in the shaft A as shown, a spring 19 maintaining it against the partition 13.

To begin with the star is placed in position and pushed down to the bottom of the slots b, the arms B' are then inserted into the slots in A' until the two spheres coincide. At this point B' is rotated until the slots b and c coincide. It is then possible to bring the star back into its place in which it will remain being held by the punch 11 acted upon by the spring 19.

The joint shown in section in Figure 11 is the one of Figure 7 which does not consist of fractions of concentric spheres; the two spheres in this case have the same diameter, and coalesce by suitable arms.

In this case, the partition 13 becomes unnecessary, the longitudinal centering being secured by the external spherical girdle 20 in two parts. The punches are replaced by balls 16—16, both screwed into the shafts A and B. The outer ends of the arms 15 terminate in a flat piece 15'—15' which lodges in a suitable slot in the spherical girdle 20. The rollers 14' are mounted on the arms 15 and operate in slots 16' in the members on the shafts A and B.

Figure 12 relates, like Figure 11, to a joint with spheres of the same diameter and shows a modification of the drive of the star. In this case, a pinion 5' is placed on the axle of one or on several of the rollers 5 of the star, the said roller being in gear with racks 17—17' integral with the two spheres respectively.

With reference to Figs. 13 to 16 inclusive it is to be noted that the star shaped member includes three sections, namely, a central section 3' and side or end sections 3", each section including an annular portion provided with radial arms 15 projecting from the outlet thereof. These arms have reduced terminals 15' which are accommodated in the two part girdle 20 as shown in Fig. 11.

It is evident for anybody acquainted with the art that modifications in details may be introduced without effecting the essentials of the invention, such modifications will naturally be due to the conditions under which the shafts have to work and especially to the amount of power to be transmitted; thus in the case of the device shown in Figure 11 from the mechanical and kinematical point of view, the balls 16—16' might very easily be placed at the ends of a small axle located at the centre of the star; the balls being then replaced by suitable sockets contrived in the extensions of the two shafts.

Having thus fully described the invention what is claimed as new and desired to be secured by Letters Patent is:—

1. A universal joint including in combination main and driven shafts, interengaging elements carried by the adjacent ends of said shafts, means confined by said elements for guiding the relative movement of said elements and shafts including a bearing member composed of a ring-like hub and arms slidably engaged with the elements, a spool shaped bearing member in which the ring-like hub is slidably arranged, and other bearing members extending from the inner surfaces of the elements and in alignment with the longitudinal axes of the corresponding shaft and engaged with said spool shaped bearing member.

2. A universal joint including in combination main and driven shafts, substantially spherical and slotted elements carried by and adjacent said shafts and interengaged with each other, a star-shaped member interposed between and confined by said spherical elements and including a ring-like hub, radial arms projecting from the hub and arranged in the slots in the elements for ensuring of equal rotation of the shafts, rollers mounted on the arms for engagement with the sides of the slots, means for maintaining the star-shaped member in proper position during relatively angular movements of the shafts including a spool shaped bearing member in which the ring-shaped hub is slidably arranged, and bearing members extending from the inner surface of each of the spherical members and in alignment with the longitudinal axes of the corresponding shaft for engagement within said spool shaped bearing member.

3. A universal joint as claimed in claim 2, wherein the spool shaped bearing member is formed with a tubular central portion, and a double convex bearing member mounted centrally within said tubular portion and being contacted by the ends of the bearing members of the spherical elements.

4. A universal joint including in combination main and driven shafts, substantially spherical and slotted elements carried by the adjacent ends of said shaft and interengaged with each other, a star-shaped member interposed between and confined by said spherical elements including a ring-like hub and radial arms extending from the hub and arranged in the slots of the elements for ensuring of equal rotation of the shafts, a spool shaped bearing member including a hollow tubular portion slidably confining the ring-like hub, a double convex bearing member mounted medially of the ends of the hollow tubular portion, other bearing members extending from the inner surfaces of the spherical elements and in alignment with the corresponding shafts for contacting with the adjacent convex surfaces of the central bearing member for maintaining the starshaped member in proper position during relative angular movements of the shafts and one of said last mentioned bearing members being yieldingly mounted within the corresponding spherical elements.

In testimony whereof I affix my signature.

GEORGES HENRI ERNEST de RAM.